United States Patent

Filion et al.

[11] Patent Number: 5,591,078
[45] Date of Patent: Jan. 7, 1997

[54] AUTOMOTIVE INTERIOR TRIM HAVING INTEGRATED DEFROST DUCT

[75] Inventors: Scott M. Filion, Newmarket; Christopher Gallant, Greenland, both of N.H.

[73] Assignee: Davidson Textron Inc., Dover, N.H.

[21] Appl. No.: 535,985

[22] Filed: Sep. 29, 1995

[51] Int. Cl.⁶ ............................................. B60S 1/54
[52] U.S. Cl. ............................... 454/124; 296/146.7
[58] Field of Search ............... 454/85, 93, 124, 454/127, 198; 296/146.1, 152, 146.7

[56] References Cited

U.S. PATENT DOCUMENTS

| | | |
|---|---|---|
| 2,133,488 | 10/1938 | Stearns . |
| 2,492,506 | 12/1949 | Stinnett . |
| 2,640,231 | 6/1953 | Berger . |
| 2,837,018 | 6/1958 | Haltenberger . |
| 3,602,126 | 8/1971 | Breitschwerdt ............. 454/124 |
| 3,715,966 | 2/1973 | Miettinen ................... 454/124 |
| 3,791,693 | 2/1974 | Hellriegel et al. .......... 296/146.7 |
| 3,835,757 | 9/1974 | Shakespear et al. . |
| 4,173,174 | 11/1979 | Vinko et al. ............. 454/124 X |
| 4,512,240 | 4/1985 | Mahler et al. ............. 454/124 |
| 4,646,879 | 3/1987 | Mahler et al. ........... 454/124 X |
| 4,923,542 | 5/1990 | Janicki et al. .......... 296/146.7 X |
| 5,141,279 | 8/1992 | Weller ..................... 296/146.7 |
| 5,399,121 | 3/1995 | Gray et al. ................ 454/137 |

FOREIGN PATENT DOCUMENTS 58-30852  2/1983  Japan ..................... 454/124

Primary Examiner—Harold Joyce
Attorney, Agent, or Firm—Reising, Ethington, Barnard & Perry

[57] ABSTRACT

A trim molding for a framed opening of a vehicle has an outer flexible skin backed by an energy-absorbing foam core to provide impact protection to the occupants of the vehicle. Imbedded in the foam core is an air duct having an inlet and a plurality of outlets for directing a flow of air out of the duct and on to an adjacent window of the vehicle to clear the window of condensation. The duct yields under the force of impact so as not to detract from the energy-absorbing attribute of the foam.

9 Claims, 2 Drawing Sheets

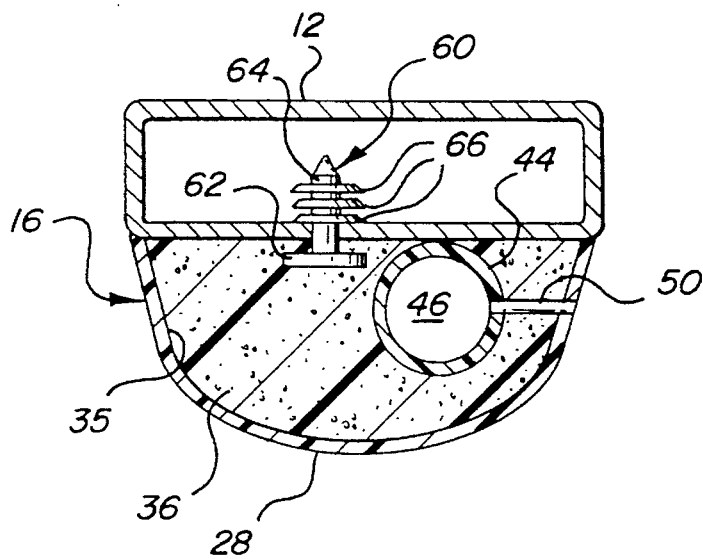
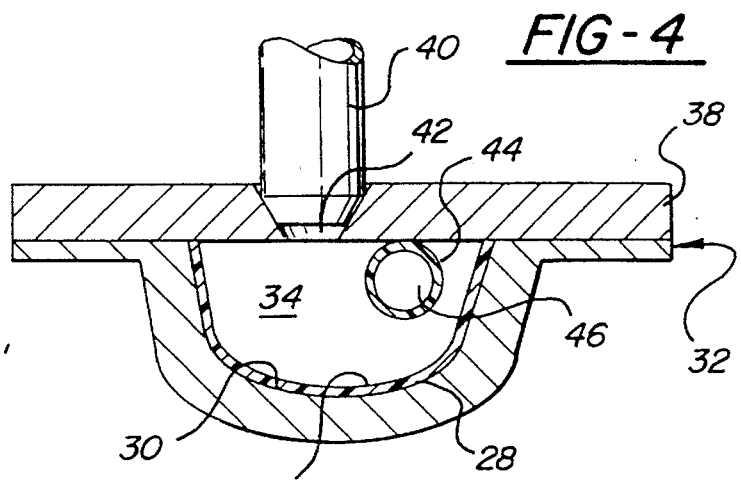
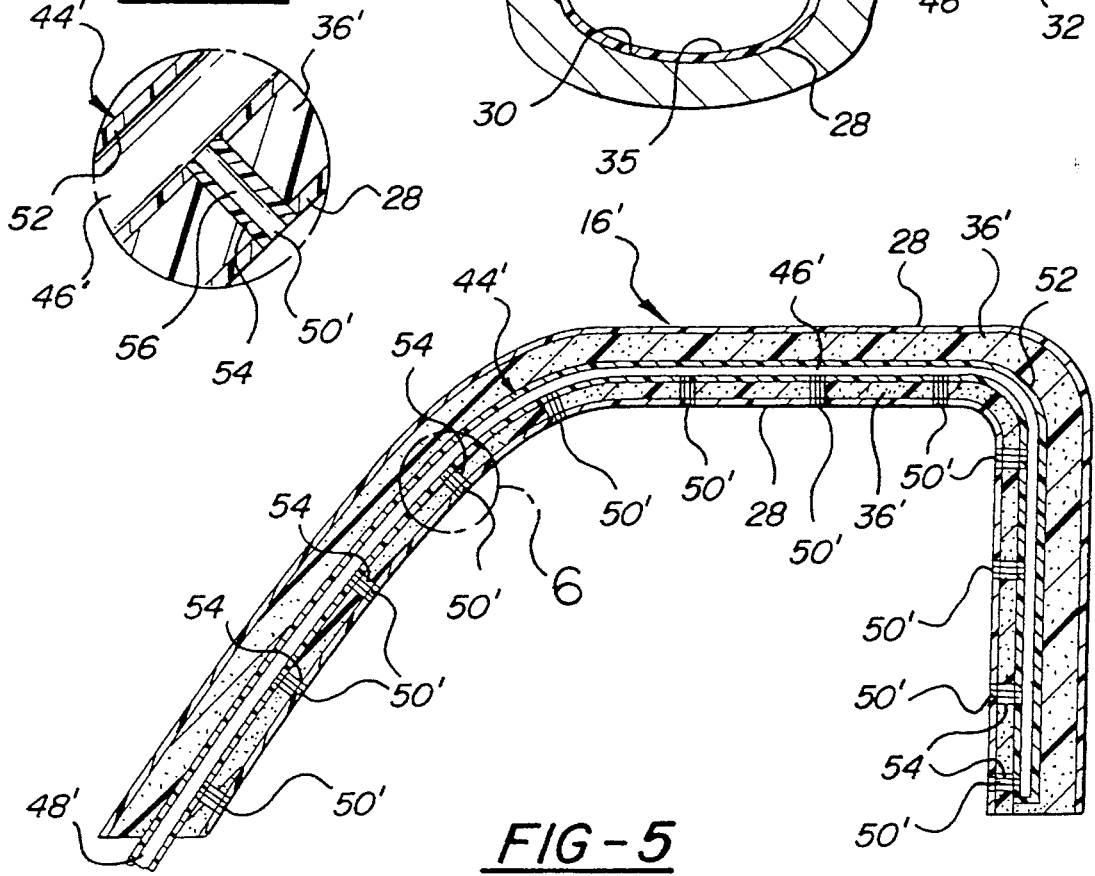

200
AUTOMOTIVE INTERIOR TRIM HAVING INTEGRATED DEFROST DUCT

This invention relates to interior trim moldings for automobiles and their methods of manufacture and particularly to those used to cover a frame of the vehicle adjacent a window and incorporating an integrated defrost duct.

BACKGROUND OF THE INVENTION

At present, the interior trim moldings used to cover most framed openings of a vehicle, such as the fore and aft pillar posts, are made of hard nonenergy-absorbing injection molded plastics material. Future Federal Safety Regulations are expected to require that such trim moldings be designed to absorb energy on impact to offer better impact protection to the occupants of the vehicle in the event of an accident.

SUMMARY OF THE INVENTION AND ADVANTAGES

The present invention addresses the aforementioned deficiencies of injection molded trim moldings by forming the trim component from a skin of outer flexible material backed by a core of energy-absorbing foam material that is molded in place against the outer skin to provide improved impact protection to the occupants of the vehicle. In addition the trim molding incorporates an integrated preformed air duct that is encapsulated by the core during the in-place molding of the core and is provided with an inlet and a plurality of outlets for directing a flow of air through the duct from the vehicles ventilating system and onto an adjacent window of the vehicle to clear it of condensation and promote air circulation within the vehicle.

Although various door and frame constructions are known to include an air duct system, none apply to energy-absorbing trim molding for covering the framed openings of the vehicle, and particularly having an integrated, molded-in-place air duct encapsulated by the core. Additionally, the air duct of the present invention is constructed to yield by deformation or fracture under the force of impact so as not to detract and perhaps to enhance the energy-absorbing attribute of the foam core.

THE DRAWINGS

Presently preferred embodiments of the invention are disclosed in the following description and the accompanying drawings, wherein:

FIG. 3 is an enlarged cross-sectional view taken along lines 3—3 of FIG. 1;

FIG. 4 is a fragmentary transverse cross-sectional view through a mold in which the outer skin and inner duct are positioned in preparation for the injection of the energy-absorbing foam core;

FIG. 5 is a front cross-sectional view of an alternative trim molding construction; and FIG. 6 is an enlarged view of the encircled area of FIG. 5.

DETAILED DESCRIPTION

Figure 1:
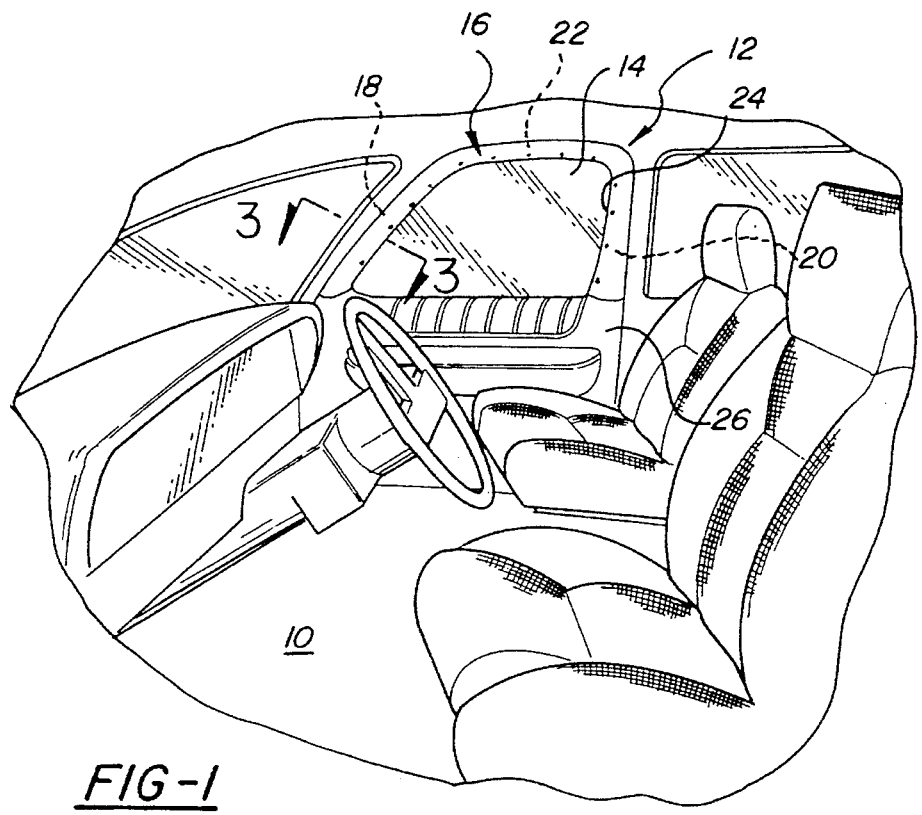
FIG. 1 is fragmentary perspective view of a passenger compartment of an automotive vehicle showing a trim molding of the invention.
Figure 2:
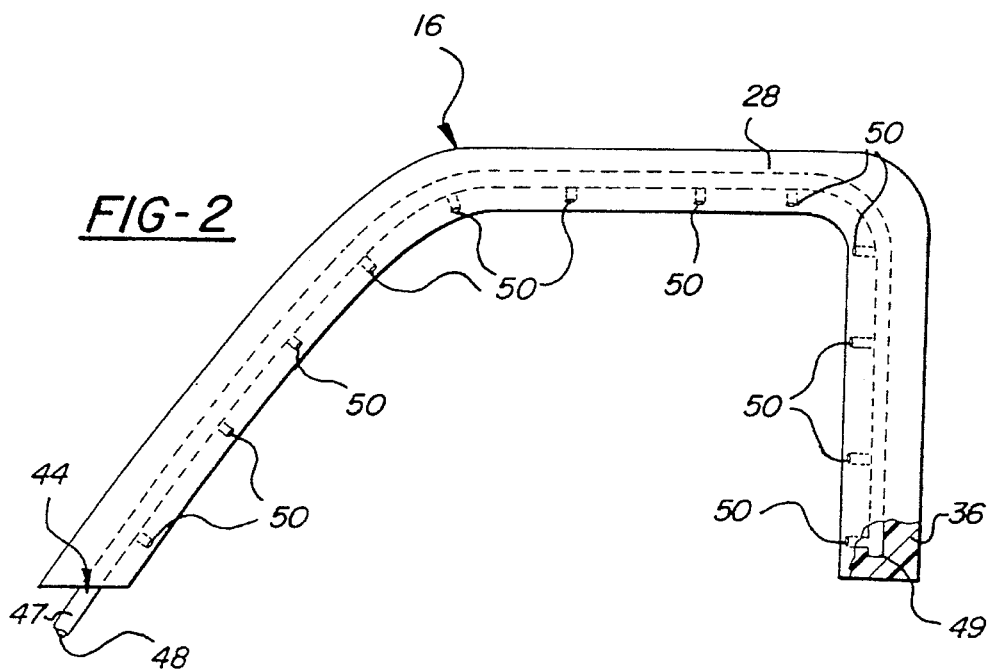
FIG. 2 is a front view of the trim molding of FIG. 1.

FIG. 1 illustrates a passenger compartment of an automotive vehicle 10 in which a frame 12 of the vehicle is shown extending about an adjacent window 14 and covered by a trim molding 16 constructed according to the invention.

The covered frame 12 of FIG. 1 includes an upright front or A pillar portion 18, an upright back or B pillar portion 20 and an interconnecting roof structure portion 22 extending between the upper ends of the pillar portions 18, 20 and framing a door opening 24 of the vehicle in which a door 26 carrying the window 14 is supported, in known manner. The trim molding 16 has the same general configuration as that of the frame on which it is mounted and in the illustrated embodiment is formed with an elongated generally U-shaped configuration.

As shown best in FIGS. 3 and 4, the trim molding 16 has an outer flexible skin 28, such as PVC or other decorative cover materials commonly utilized for interior trim coverings, that is cut to the general shape of the frame on which the molding 16 is to be mounted and then positioned in a contoured cavity 30 of a mold 32 to provide an elongate U-shaped channel 34 along an inner exposed surface 35 of the skin 28.

The channel 34 is filled with energy-absorbing foam during a subsequent molding operation in which the mold cavity 30 is closed by a backing plate 38 and the foam 36 is delivered into the channel 34 via a nozzle 40 through an opening 42 in the plate 38 to produce a resultant skin-covered core 36 of the foam material that absorbs energy on impact to protect the occupants of the vehicle in the event they are thrown against the trim molding 16.

Prior to closing the mold 32 and injecting the foam core material 36, an air duct 44 is prepared from tubular material and is positioned within the channel 34, as illustrated in FIG. 4, such that the preformed air duct 44 is encapsulated by the foam core 36 during the subsequent in-place molding of the core 36 within the channel 34. The duct 44 defines an internal longitudinal air passage 46 that is coextensive with the trim molding 16. One end 47 of the air duct 44 extends out of the trim molding 16 and is open to provide an air inlet 48 into the passage that may be connected to the existing HVAC system of the vehicle to direct a flow of air into the passage 46. The opposite end 49 of the air duct 44 is closed. As shown best in FIG. 3, apart from the air passage 46 provided by the duct 44, the foam core 36 is solid and lacks any other air channels.

A plurality of outlet openings 50 are provided at longitudinally spaced intervals along the length of the trim molding 16 for directing the flow air out of the passage 46 and on to the adjacent window 14 of the vehicle 10. The outlet openings 50 extend transversely of the air duct 44 from the passage 46 to the exterior of the trim molding 16 and may be formed by drilling holes through the trim molding 16 into the air passage 46 in a subsequent machining operation following the curing of the foam 36 and the removal of the trim molding 16 from the mold cavity 30. As shown in FIG. 3, the outlet openings 50 extend through the outer skin, the foam core 36, and the wall of the air duct 44.

The air duct 44 yields under the load of an impact along with the foam core 36 so as not to detract from and preferably enhance the energy-absorbing attribute of the foam core 36. In other words, when the trim molding 16 is impacted by an occupant of the vehicle, the presence of the embedded air duct 44 should not inhibit the capacity of the foam core 36 to absorb the energy of the impact. For this purpose, the air duct 44 is fabricated from such yieldable materials as moldable thermoplastics, that undergo brittle fracture when impacted or that deform when impacted to absorb some of the energy of the impact.

FIG. 5 illustrates an alternative embodiment of the trim molding 16' having the same outer skin 28 and foam core 36 as described above, but having an air duct 44' provided with pre-formed outlet openings 50'. As shown in FIG. 5, the air duct 44' has an elongate tubular main section or portion 52 with the elongate air passage 46' and air inlet 48' and additionally includes a plurality of tubular branched portions 54 extending transversely of the main portion 52 and defining tubular outlet passages 56 that communicates with the main air passage 46' and the exterior of the trim molding 16'. The branched portions 54 may be formed integrally with the main portion 52 or, as illustrated in FIGS. 5 and 6, may be separately formed from the main portion 52 and assembled therewith in a subsequent operation. The air duct 44' is made of the same material as the duct 44 and is likewise foamed in place with the core 36' in the same manner such that the foam core 36' encapsulates both the main portion 52 and the branch portions 54.

Also embedded in the foam core 36, 36' of either embodiment described above are a plurality of fasteners 60 (illustrated in FIG. 3) having an enlarged head 62 surrounded by the foam material 36 and a connecting shank portion 64 projecting from a back side of the trim molding 16. The fasteners 60 preferably are of the push-in self-fastening type and as such the shank 64 is provided with directional barbs or radial flanges 66 that flex inwardly to allow the shank 64 to pass through an aperture (not shown) in the vehicle structure and then return outwardly to self-secure the fastener and hence the trim molding 16 against subsequent removal.

It will be appreciated and understood by those skilled in the art that the invention is not limited to door trim moldings but is applicable in other areas of the vehicle in which hard trim molding is presently employed to cover framed openings of the vehicle adjacent a window, such as, for instance, to cover the frame of a vehicle's rear window or the frame of side windows or doors that have an integrated window frame.

The invention has been described in an illustrative manner, and it is to be understood that the terminology used herein is intended to be in the nature of words of description rather than of limitation. Obviously, one skilled in the art will appreciate that many modifications and variations of the present invention could be made in light of the above teachings without departing from the spirit of the invention. It is to be understood, therefore, that the invention may be practiced within the scope of the appended claims otherwise then as specifically described above.

What is claimed is:

1. A method of making an interior trim molding for mounting on a frame adjacent a window of an automotive vehicle, said method comprising the steps of:

preparing an outer skin of flexible cover material;

preparing an air duct of tubular material defining a self-contained air passage therein having an inlet for admitting a flow of air into the passage;

positioning the outer skin in a mold;

positioning the air duct in the mold adjacent the outer skin; and introducing energy absorbing foam material into the mold against an exposed backside surface of the outer skin and around the air duct and allowing the foam to cure to provide a molded core of the foam material encapsulating the air duct, and providing a plurality of outlet openings communicating with the air passage and the exterior of the trim molding for directing the flow of air out of the passage and onto a window of the vehicle adjacent the trim molding.

2. The method of claim 1 wherein the exterior outlets are provided by machining a plurality of holes through the trim molding at longitudinally spaced intervals into the air passage.

3. The method of claim 2 wherein the holes are machined to extend through the outer skin, foam core and a wall of the air duct.

4. The method of claim 1 including providing a plurality of branched outlet portions to the air duct projecting transversely of the duct at longitudinally spaced intervals therealong, positioning the branched portions in the mold with the air duct, and molding the foam core additionally about the branched outlet portions to encapsulate the branched portions in the foam core and provide the exterior outlets for the air passage.

5. The method of claim 1 including molding the foam core material additionally about a plurality of fasteners for attachment of the trim molding to the frame of the vehicle.

6. An interior trim molding component for covering the frame adjacent a window opening of an automotive vehicle, comprising:

an outer skin of flexible material;

an energy-absorbing foam core molded in place on a backside surface of said skin for absorbing the energy of an impact; and at least one preformed air duct encapsulated by said foam core during said in-place moulding of said foam core and yieldable under the load of an impact so as not to detract from the energy-absorbing attribute of said foam core, said duct defining a sole air passage within said core having an inlet for admitting a flow of air into said passage and a plurality of longitudinally spaced outlets extending between said air passage and the exterior of said trim component for directing the flow of air out of said passage and onto an adjacent window of the vehicle.

7. The construction of claim 6 including fasteners molded in place within said foam core having a connecting portion projecting outwardly from a back side of said foam core for mounting said trim molding to the frame of the vehicle.

8. The construction of claim 7 wherein said fasteners comprise self-fastening push-in fasteners.

9. The construction of claim 6 wherein said air duct includes an elongate tubular main portion and a plurality of branched portions extending transversely of said main portion and communicating with said passage and the exterior of said trim molding to provide said outlets for the flow of air, said main and branched portions being surrounded by said foam core.

* * * * *